Figure 1:
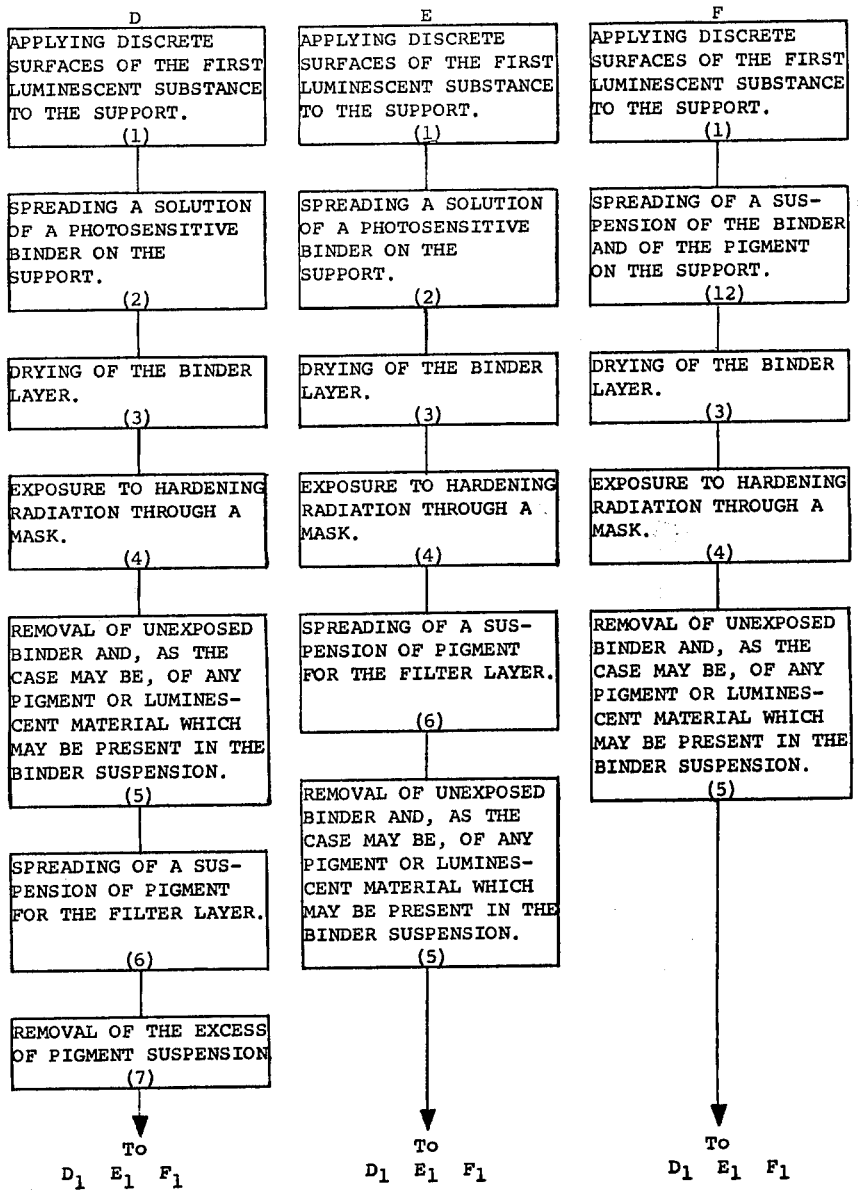

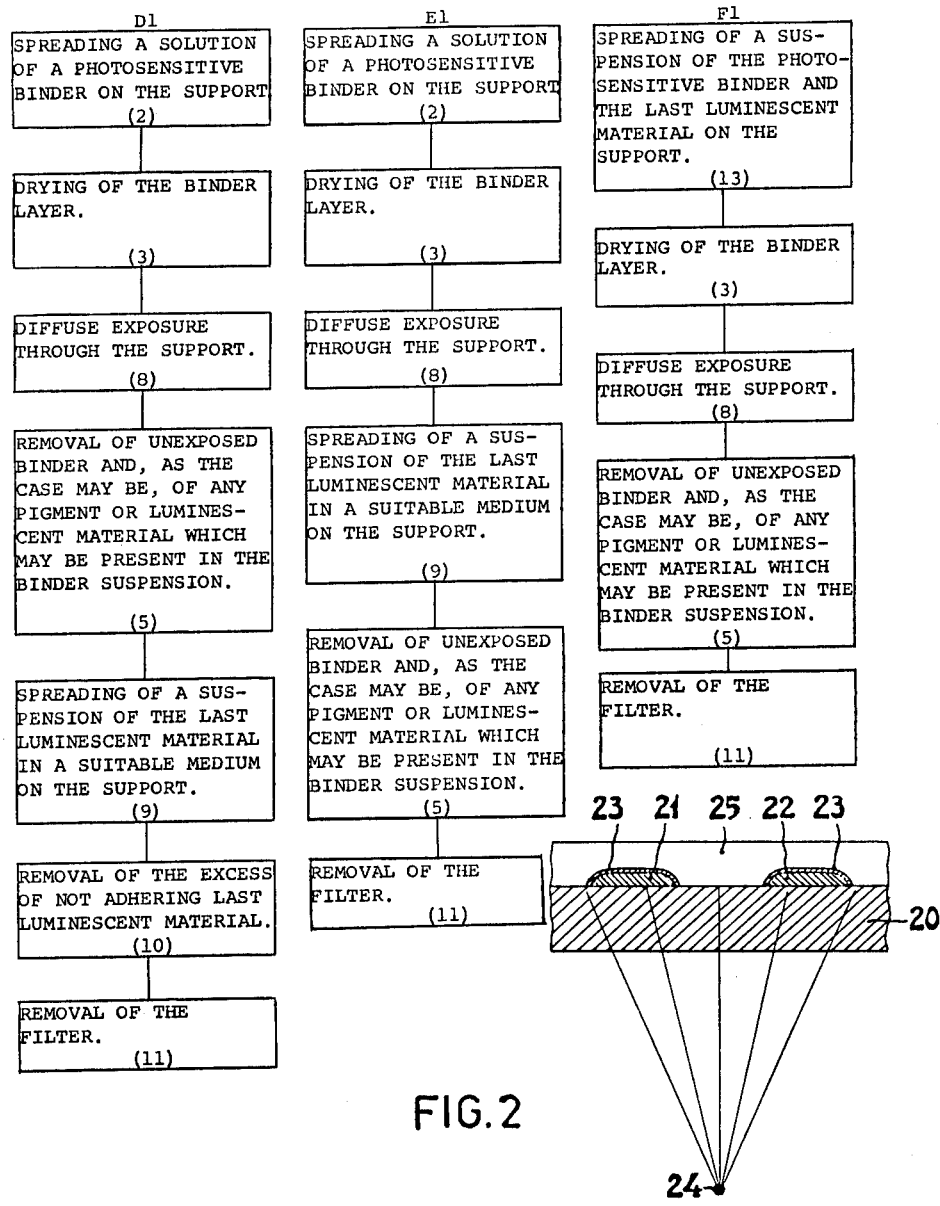

United States Patent Office 3,226,246
Patented Dec. 28, 1965

3,226,246
METHOD OF MANUFACTURING DISPLAY
SCREENS FOR CATHODE-RAY TUBES
Gerardus Antonius Wilhelmus Vermeulen and Jacobus
Cornelis Gravesteijn, Eindhoven, Netherlands, assignors to North American Philips Company, Inc., New York, N.Y., a corporation of Delaware
Filed June 9, 1961, Ser. No. 116,166
Claims priority, application Netherlands, Aug. 6, 1960, 254,649
10 Claims. (Cl. 117—33.5)

The invention relates to a method of manufacturing display screens for cathode-ray tubes comprising at least two materials which are applied to a transparent support in discrete surfaces and, when excited by electrons, luminesce emitting light of different colors. The invention also relates to cathode-ray tubes for displaying colored images by means of a display screen manufactured by such a method.

Several methods of manufacturing display screens of the abovementioned kind are known, in which the various luminescent materials are applied in succession by means of a number of operations which are repeated for each material. Two methods in which the materials are made to adhere to the support by a photosensitive binder, that is to say, a substance which, when exposed to so-called "hardening radiation," no longer dissolves in a given solvent, will briefly be described hereinafter under headings A and B.

(A) The luminescent material to be applied is suspended in a solution of the photosensitive binder, which solution generally contains a sensitizer also. The suspension is spread on the support and dried. From the side of the layer more remote from the support, the hardening radiation is then projected onto the areas where the discrete surfaces of the luminescent material are to be provided, so that in these areas the binder is rendered insoluble in the solvent. (This solvent need not be the same as that in which the binder was first dissolved.) Subsequently, the luminescent material is removed from the non-exposed areas by washing with the solvent. By these operations, the support is covered with discrete surfaces of the luminescent material. The desired distribution of the discrete surfaces may be obtained by using a point source of radiation and interposing between this source and the layer to be irradiated a mask having apertures of the same shape and distribution as the desired discrete surfaces, for example round apertures if a pattern of circular points is desired.

To those parts of the support which after these operations are not covered with luminescent material, a second and, if required, further luminescent materials may be applied in discrete surfaces by repeating the above described operations. Thus, a screen which is widely used in color television may be manufactured with the aid of three different luminescent materials, the discrete areas being circular dots of equal size which adjoin one another in closest possible stacking and effectively form triangular elements, a different luminescent material being disposed at each vertex.

It is common practice to apply three luminescent materials emitting red, green and blue light, respectively, by this method with the aid of an aqueous solution of polyvinyl alcohol as the binder, a bichromate, for example ammonium bichromate, being used as a sensitizer. A dried layer of this suspension can be hardened by exposure by means of radiation having a wavelength of from 360 m$\mu$ to 500 m$\mu$, after which the binder is no longer soluble in water or alcohol.

(B) This method is distinguished from the method described under the heading A by the fact that the luminescent material is not suspended in the solution of the photosensitive binder. Thus, a layer of binder only is exposed through a mask. In the exposed areas the binder becomes insoluble, however, if exposure is not continued for a prolonged period of time, it remains slightly sticky. The luminescent material may then be applied by two methods described hereinafter under headings B1 and B2.

(B1) The unexposed portions of the binder layer are removed by washing with the solvent. A suspension of the luminescent material to be supplied in a suitable medium is then spread on the remaining sticky parts of the binder. Grains of luminescent material adhere to the sticky portions. By a simple rinsing operation, the luminescent grains may be removed from all other portions.

(B2) A suspension of the luminescent material to be applied in a suitable medium is spread on the locally exposed binder layer. Grains of the luminescent material adhere to the sticky portions; there is no adherence to the portions which are unexposed and hence not sticky. By rinsing in the solvent for the exposed binder, the latter is entirely removed together with the non-adhering luminescent grains.

In addition to the methods A and B, further methods of applying the discrete areas of the luminescent materials are known, for example silk-screen printing and other printing processes.

According to the invention, in a method of manufacturing display screens for cathode-ray tubes comprising at least two substances which are applied in discrete surfaces to a transparent support, which, when excited, luminesce emitting light of different colors and are successively made to adhere to the support, the last luminescent material is applied with the use of a photosensitive binder, a solution of which is spread on the support provided with the previously applied discrete surfaces of the other luminescent materials, after which the solution is dried and exposed to the influence of hardening radiation which passes through the discrete surfaces of the other luminescent materials already provided. The method is characterized in that in the areas occupied by the last-mentioned luminescent materials, a layer filtering out the hardening radiation is interposed between the support and the binder, irradiation being performed through the support, after which the unexposed binder and the filter layer are removed.

In order to prevent unnecessary complication of the following description of the invention, it will be assumed that only two luminescent materials, referred to as the first material and the last material, have to be applied. Without alteration of the characteristic part of the method according to the invention, the first material may be replaced by two or more luminescent materials, which in this event are applied in succession by any known method.

The first luminescent material is applied to the support, i.e. by settling from a solution so as to be divided into discrete surfaces. The support together with the applied discrete surfaces of the first luminescent material is then coated with a solution of a photosensitive binder which subsequently is dried. If this dried coating is exposed through the support, the entire binder layer would be rendered insoluble but for the presence of the above-mentioned filter layer which is interposed between the support and the binder in the discrete areas occupied by the first material previously applied, for the hardening radiation is capable of penetrating not only the support but also the already applied surfaces of the first material. Hence, the last luminescent material, which has to be made to adhere to the binder, would adhere throughout the entire surface inclusive of the areas occupied by the first material, so that in the operation of the tube serious color contamination would occur. By the provision of the filter layer in the discrete areas occupied by the first luminescent material, the last luminescent material is prevented from adhering to these surfaces. At all other points, the last luminescent material is deposited on the support. This results in a screen in which the discrete surfaces of the first luminescent material are surrounded by the last luminescent material. Herein lies the advantage of the invention, for in operation a screen manufactured by this method provides a greatly improved contrast of the image observed, since an observer can no longer be struck by cathode light.

The invention provides a particular advantage if the composite luminescent layer is coated with a thin layer of metal. If, as is the case in manufacture by the known methods, certain areas of the support are left uncovered, external light striking the screen may be reflected by the metal layer. This again gives rise to a serious contrast reduction in the image observed. In a screen manufactured by a method according to the invention, this is rendered impossible since the support is entirely covered by luminescent materials.

The last luminescent material may be applied either by method A or by method B (with the obvious exception of the exposure in discrete surfaces). The method A is to be preferred owing to its simplicity. When the last luminescent material has been made to adhere, the unexposed binder and, as the case may be, the part of the last luminescent material applied to the discrete surfaces of the first luminescent material are removed. This is effected in the same manner as in the known methods by washing with the solvent. Finally, the filter layer is removed by dissolving it.

If luminescent materials are applied one of which has a higher absorption of the hardening radiation than the other or others, the substance having the higher absorption is the last to be applied. The last material to be applied may have a higher absorption, since exposure is effected through the support. Thus, in the areas in which this material has to be made to adhere to the support between the discrete surfaces of the other materials already applied, the hardening radiation directly reaches the binder on the support.

The filter layer may be applied in various manners and at various instants of the manufacture of the screen. The grains of the first luminescent material may previously be coated with the filter material and then applied to the support. Alternatively, however, the areas of the support subsequently to be occupied by the discrete surfaces of the first luminescent material may be coated with a filter layer. A pigment may be made to adhere to these areas by either the method A or the method B. Exposure is in this event effected through the mask to be subsequently used in the exposure of the discrete surfaces to the first luminescent material.

A third method of applying the filter layer is the following. One starts by applying the first luminescent material in discrete surfaces, for example by the method A or the method B, after which these discrete surfaces are coated with the filter layer. For this purpose, one may use a dye or a solution of a dye which adheres to the luminescent material but does not adhere to the material of the support.

Alternatively, a pigment may be applied to the discrete surfaces of the first luminescent material. This may again be effected by the method A or the method B. Obviously, exposure of the photosensitive binder has again to be performed so that only binder on the first luminescent material is rendered insoluble. For this purpose, in this case also the mask with the aid of which the discrete surfaces of the first luminescent material have been applied is preferably used.

If the method A is used, in which the pigment is contained in a suspension together with the binder, the hardening radiation for the adhesion of the pigment has to penetrate through this suspension. Since the pigment is a filter for the hardening radiation, in this method of causing the pigment to adhere, exposure must be longer than is required for the adhesion of the last luminescent material.

When applying the binder for the last luminescent material, the filter layer must not be dissolved in the solvent of the binder. If, after the exposure, another solvent is used for removing the binder of the last luminescent material, the filter layer is allowed to dissolve therein, for the last luminescent material adheres already to the relevant areas of the support so that the filter is no longer necessary. If the same solvent, for example water, is used for applying and for removing the binder, the filter layer should subsequently be removed with another solvent, for example with an organic liquid, such as alcohol or acetone.

In order that the invention may readily be carried out, embodiments thereof will now be described, by way of example, with reference to the accompanying drawing, in which:

FIGURES 1(a) and 1(b) are flow sheets illustrating the methods according to the invention.

FIGURE 2 shows part of a cross-sectional view of a luminescent screen during one of the stages of manufacture.

Referring to the drawing, FIGURE 1(a) shows three different methods of applying the first luminescent material on the support and FIGURE 1(b) shows three methods for applying the filter layer and the last luminescent material. Any of the methods shown in FIGURE 1(b) may be used with any of the methods shown in FIGURE 1(a).

In FIGURE 2, reference numeral 20 designates a part of a support, which may consist of glass, for the luminescent screen. To this support are applied discrete surfaces 21 and 22 of two different luminescent materials emitting, for example, green and blue light, respectively. Between these surfaces 21 and 22, the entire support must be covered with a third luminescent material emitting, for example, red light. For this purpose, the surfaces 21 and 22 are first coated with a filter layer 23 which absorbs the hardening radiation for the binder of the third luminescent material. A source of the hardening radiation, which emits a diffuse beam of rays, is designated 24.

A layer 25, which according to the diagram F of FIGURE 1 contains, in addition to the binder, the last luminescent material to be applied, is spread on the support 20 and the surfaces 21 and 22 and the superimposed filter layers 23. Radiation emanating from the source 24 can only reach the layer 25 between the discrete surfaces 21 and 22 and the superimposed filter layers 23. In the areas between these surfaces, the binder is rendered insoluble by the radiation; however, on top of the filter layers 23 it remains soluble and hence readily removable. After the exposure, the binder and the non-adhering luminescent material are removed from the unexposed areas, that is to say from the filter layers 23. On the support, however, between the discrete surfaces 21 and 22 the binder and the luminesecnt material contained therein are left and fill the entire free part of the surface of the support between the discrete surfaces. Finally, the filter layers 23 are dissolved.

Examples of suitable luminescent materials are: willemite for green, silver-activated zinc sulphide for blue; silver-activated zinc-cadmium sulphide for red. The latter material is relatively opaque to radiation having a wavelength between 360 m$\mu$ and 500 m$\mu$. Consequently, if this radiation is used to harden the binder, which may be an aqueous solution of polyvinyl alcohol containing a bichromate as sensitizer, the luminescent material emitting red light is the last to be applied.

For the filter, one may use, as the pigment, a spirit soluble dyestuff commercially available under the trademark Grasolechtgelb 3 G.L. from the firm of Geigy of Basel.

What is claimed is:

1. A method of manufacturing a display screen for a cathode ray tube comprising the steps of placing over a transparent support having selected areas thereof covered with a luminescent material a filter material relatively opaque to radiation which is transmitted through the support, covering the support with a photosensitive hardenable binder, exposing the binder through the support to radiation which is capable of hardening the binder in areas free of luminescent material, removing the unexposed binder covering the luminescent material, and depositing on the hardened binder a luminescent material which when excited by electrons emits light different in spectral distribution than that of said first mentioned luminescent material.

2. A method of manufacturing a display screen for a cathode ray tube comprising the steps of depositing at least two luminescent materials on selected areas of a transparent support, placing over the selected areas of the support a filter material relatively opaque to radiation which is transmitted through the support, exposing the binder through the support to radiation which is capable of hardening the binder in areas free of luminescent material, removing the unexposed binder covering the luminescent material, and depositing on the hardened binder a luminescent material which when excited by electrons emits light different in spectral distribution than that of either of said first mentioned luminescent materials.

3. A method of manufacturing a display screen for a cathode ray tube comprising the steps of depositing at least two luminescent materials emitting light of different spectral distributions when excited by electrons on selected areas of a transparent support, placing over the selected areas of the support a filter relatively opaque to radiation transmitted through the support, depositing another luminescent material mixed with a photosensitive hardenable binder on areas of said support between the areas covered by the first luminescent material, said latter luminescent material emitting light of a different spectral distribution than that of said first mentioned luminescent materials, exposing the binder through the support to radiation which is capable of hardening the binder except for the areas covered by the first mentioned luminescent materials, and removing the unexposed binder covering the first mentioned luminescent materials.

4. A method of manufacturing a display screen for a cathode ray tube comprising the steps of placing over a transparent support covered at selected areas with a luminescent material, a filter material consisting of a colored pigment relatively opaque to radiation which is transmitted through the support covering the transparent support with a photosensitive hardenable binder exposing the binder through the support to radiation which is capable of hardening the binder in areas free of luminescent material, removing the unexposed binder covering the luminescent material, and depositing on the hardened binder a luminescent material which when excited by electrons emits light different in spectral distribution than that of said first mentioned luminescent material.

5. A method of manufacturing a display screen for a cathode ray tube comprising the steps of placing over selected areas of a transparent support a filter material relatively opaque to radiation which is transmitted through the support, applying a photosensitive hardenable binder mixed with a solvent over a luminescent material covering the selected areas of the transparent support and over areas of the support free of the luminescent material, said filter material being relatively insoluble in said solvent, exposing the binder through the support to radiation which is capable of hardening the binder in areas free of the luminescent material, removing the unexposed binder covering the luminescent material, and depositing on the hardened binder a luminescent material which when excited by electrons emits light different in spectral distribution than that of said first mentioned luminescent material.

6. A method of manufacturing a display screen for a cathode ray tube comprising the steps of depositing at least two luminescent materials on selected areas of a transparent support, said luminescent materials emitting light of different spectral distributions when excited by electrons, depositing a photosensitive hardenable binder mixed with a filter material relatively opaque to radiation which is transmitted through the support over said luminescent materials, depositing on said support in areas free of luminescent material a photosensitive binder free of the filter material, exposing the binder through the support to radiation which is capable of hardening the binder in areas free of luminescent material, removing the unexposed binder covering the luminescent material, and depositing on the hardened binder a luminescent material which when excited by electrons emits light different in spectral distribution than that of either of said first mentioned luminescent materials.

7. A method of manufacturing a display screen for a cathode ray tube comprising the steps of depositing at least two luminescent materials on selected areas of a transparent support, each of said luminescent materials emitting light of different spectral distributions when excited by electrons, depositing over said luminescent materials a photosensitive hardenable binder mixed with a solvent and containing a filter material relatively opaque to radiation which is transmitted through the support depositing on said support in areas free of luminescent material a potosensitive hardenable binder free of filter material, exposing the binder through the support to radiation which is capable of hardening the binder in areas free of luminescent material, removing the unexposed binder covering the luminescent material, and depositing on the hardened binder a luminescent material which when excited by electrons emits light different in spectral distribution than that of either of said first mentioned luminescent materials.

8. A method of manufacturing a display screen for a cathode ray tube comprising the steps of depositing at least two luminescent materials on selected areas of a transparent support, each of said luminescent materials emitting light of a different spectral distribution but substantially free of red components, covering the selected areas of the support with a filter material relatively opaque to radiation which is transmitted through the support depositing a photosensitive hardenable binder on said luminescent materials and on areas of said support free of luminescent material, exposing the binder through the support to radiation which is capable of hardening the binder in areas free of luminescent material, removing the unexposed binder covering the luminescent material, and depositing on the hardened binder silver-activated zinc-cadmium sulfide which when excited by electrons emits light substantially in the red portion of the visible spectrum.

9. A method of manufacturing a display screen for a cathode ray tube comprising the steps of placing over selected areas of a transparent support covered with a luminescent material a filter material consisting of a colored pigment soluble in an organic solvent and relatively opaque to radiation which is transmitted through the support depositing over the luminescent material and areas of the support free of luminescent material a photosensitive hardenable binder, exposing the binder through the support to radiation which is capable of hardening the binder in areas free of luminescent material, removing the unexposed binder covering the luminescent material, and depositing on the hardened binder a luminescent material which when excited by electrons emits light different in spectral distribution than that of said first mentioned luminescent material.

10. A method of manufacturing a display screen for a cathode ray tube comprising the steps of depositing on a transparent support a photosensitive hardenable binder and a filter material relatively opaque to radiation transmitted through the support which is capable of hardening the binder, exposing discrete areas of the support through a mask to radiation which hardens the binder, removing the unexposed binder, depositing at least two luminescent materials each emitting light of a different spectral distribution when excited by electrons at the discrete areas of the support covered with hardened binder and filter material, depositing the photosensitive hardenable binder over the luminescent materials and the areas of the support free of luminescent materials, exposing the binder through the support to radiation which is capable of hardening the binder in areas free of luminescent material, removing the unexposed binder covering the luminescent material, and depositing on the hardened binder a luminescent material which when excited by electrons emits light different in spectral distribution than that of either of said first mentioned luminescent materials.

References Cited by the Examiner

UNITED STATES PATENTS

| | | | |
|---|---|---|---|
| 2,310,863 | 2/1943 | Leverenz | 117—33.5 |
| 2,629,657 | 2/1953 | Duerr et al. | 96—9 X |
| 2,828,435 | 3/1958 | Hoyt | 117—33.5 |
| 2,837,429 | 6/1958 | Whiting | 117—33.5 |
| 2,897,089 | 7/1959 | Ahlburg et al. | 117—8.5 |
| 2,932,570 | 4/1960 | La Buff | 117—33.5 |
| 2,959,483 | 11/1960 | Kaplan | 117—33.5 |
| 2,992,107 | 7/1961 | Kaplan et al. | 117—33.5 |
| 3,025,161 | 3/1962 | Rychlewski | 96—35 |
| 3,080,231 | 3/1963 | Perry et al. | 96—35 |

FOREIGN PATENTS 795,354    5/1958    Great Britain.

WILLIAM D. MARTIN, *Primary Examiner.*

RICHARD D. NEVIUS, *Examiner.*

Notice of Adverse Decision in Interference

In Interference No. 95,766 involving Patent No. 3,226,246, G. A. W. Vermeulen and J. C. Gravesteijn, METHOD OF MANUFACTURING DISPLAY SCREENS FOR CATHODE-RAY TUBES, final judgment adverse to the patentees was rendered Feb. 6, 1969, as to claim 3.

[*Official Gazette September 2, 1969.*]